United States Patent [19]
Hall, Jr.

[11] Patent Number: 4,502,377
[45] Date of Patent: Mar. 5, 1985

[54] SAFETY SYSTEM FOR APPARATUS FOR PROCESSING FROZEN COMESTIBLES

[75] Inventor: James F. Hall, Jr., Ardsley, Pa.

[73] Assignee: Custom Creamery Systems, Inc., New York, N.Y.

[21] Appl. No.: 584,519

[22] Filed: Feb. 28, 1984

[51] Int. Cl.³ .......................... A23G 9/02; A23G 9/04
[52] U.S. Cl. ........................................ 99/492; 99/348; 99/494; 366/318; 366/601
[58] Field of Search ................. 99/348, 452, 494, 460, 99/516, 517; 426/518, 519; 425/206–209, 151, 135, 200, 182; 366/194–198, 203, 204, 206, 207, 212, 219, 279, 323, 140, 142, 247; 222/108, 52, 413, 63; 241/282.1; 248/318

[56] References Cited

U.S. PATENT DOCUMENTS

| | | | |
|---|---|---|---|
| 2,565,426 | 8/1951 | Hayes, Jr. | 366/204 |
| 3,061,279 | 10/1962 | Reed | 222/413 |
| 4,297,038 | 10/1981 | Falkenbach | 366/601 X |

Primary Examiner—Timothy F. Simone
Attorney, Agent, or Firm—Auslander & Thomas

[57] ABSTRACT

A comestible processing apparatus employs an auger and receptacle in processing. In order to protect the operator or anyone having access to the apparatus while the auger is moving, a safety door and switch are provided, disenabling the auger when the door is open or until the auger in the receptacle is inaccessible through the door.

3 Claims, 5 Drawing Figures

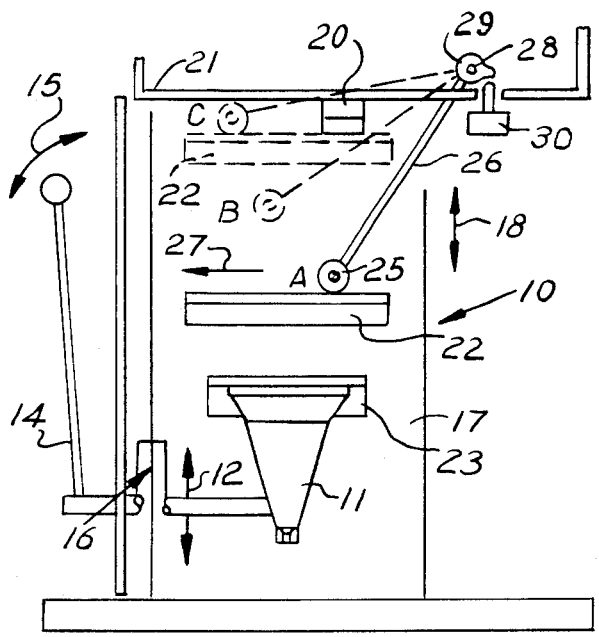
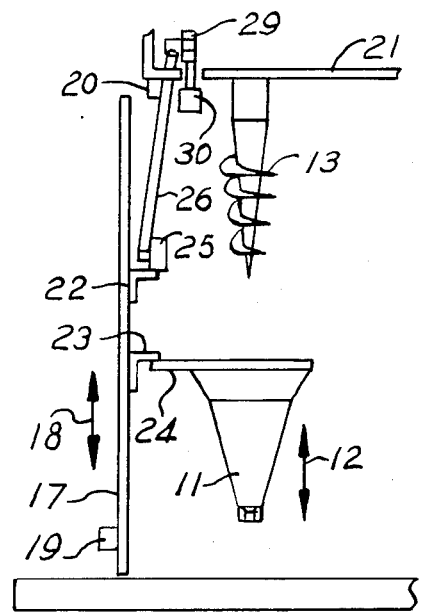
FIG.1  FIG.2
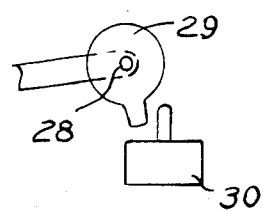
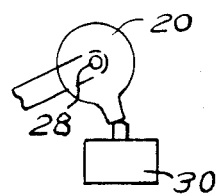
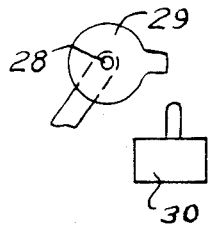
FIG.1c  FIG.1b  FIG.1a

SAFETY SYSTEM FOR APPARATUS FOR PROCESSING FROZEN COMESTIBLES

BACKGROUND OF THE INVENTION

The present invention relates to an apparatus for processing frozen comestibles and in particular to an improvement therein for the commercial use thereof.

Apparatus of this type are disclosed in U.S. Pat. Nos. 2,409,067; 2,676,132; 2,625,133; 3,061,279, U.S. patent application Ser. No. 478,219 filed Mar. 24, 1983 and U.S. patent application Ser. No. 547,331, filed Oct. 31, 1983. The description of the apparatus of the last-mentioned patent is incorporated herein by reference with regard to the details of the mechanism thereof.

SUMMARY OF THE INVENTION

The main object of the present invention is to provide an improvement therein to make the apparatus usable in commercial establishments where operational safety is mandated.

This, and other objects of the invention, are achieved in accordance with the invention by a safety interlock means which prevents or otherwise discourages bodily access to the rotating auger, when the auger and receptacle are in operational engagement.

The apparatus has a receptacle for receiving a frozen comestible, a rotatable auger and operational engagement means mounting the receptacle and auger for relative movement toward and away from each other. Such engagement means are in the form of a manually activatable arm for moving the auger into and out of the receptacle in a first, relatively brief operation to create a pocket in the frozen comestible for the insertion of flavoring material, and in a second, relatively longer operation to mix the frozen comestible and flavoring material and extrude the mixture from the receptacle. The safety interlock means is operatively connected to the operational engagement means and the means for rotating the auger. The actuation of the auger rotation means is prevented when the access panel to the apparatus is fully open or when the auger and receptacle are disengaged. The access panel has three operating positions: (1) fully open, as when the operator inserts frozen comestibles into the receptacle, (2) partially open, as when a container is inserted under the receptacle to receive the extruded comestible mix, and (3) partially open, as when the auger is creating a pocket in the frozen comestible, i.e., auger and receptacle, are engaged.

Thus, the safety interlock means provides that the rotating auger that creates a pocket in the frozen comestible is shielded by the auger being beyond the opening and in the receptacle, and the rotating auger when extruding the frozen comestible mix is likewise shielded. In the latter application, the access panel requires being partially open in order that the operator can insert a container under the receptacle so as to catch the extruded comestible mix.

The safety interlock means comprises an auger rotation actuation switch that is normally open when the access panel is fully open or when the auger and receptacle are disengaged. The access panel and the auger and receptacle operational engagement means are operationally connected to the actuation switch via: (1) a limiting stop and (2) a follower and cam linkage. The follower and cam linkage is disposed between the limiting stop and the actuation switch. The limiting stop is operationally engageable by either the access panel or the receptacle when said auger and receptacle are engaged. The interlock provides that the auger will only rotate at the specific times and safe circumstances as heretofore described.

It is an object of this invention to provide a safety interlock for a frozen comestible processing apparatus, wherein bodily access is prevented or otherwise discouraged to the rotating auger.

It is another object of the invention to allow rotation of the auger only when safe circumstances are afforded to the operator of the frozen comestible processing apparatus.

Although such novel feature or features believed to be characteristic of the invention are pointed out in the claims, the invention and the manner in which it may be carried out, may be further understood by reference to the description following and the accompanying drawings.

BRIEF DESCRIPTION OF THE DRAWINGS

FIG. 1 is a schematic back view of the safety interlock mechanism for a frozen comestible processing apparatus in accordance with this invention.

FIGS. 1a, 1b and 1c are schematic view of three respective positions for a cam and switch corresponding to three separate modes of operation for the safety interlock mechanism of FIG. 1; and FIG. 2 is a schematic side view of the invention illustrated in FIG. 1.

DETAILED DESCRIPTION OF THE INVENTION

Referring now to the figures in greater detail, where like reference numbers denote like parts in the various figures.

Generally speaking, the invention features a safety interlock mechanism that is designed to prevent, or at the minimum, discourage all but deliberate bodily access to the rotating auger of a frozen comestible processing apparatus, i.e., to limit access to potentially dangerous moving parts.

The operator of the frozen comestible processing machinery must reach into the apparatus on three separate occasions: (1) to insert a fresh charge of ice cream or other frozen dessert into the receptacle prior to making a pocket in the ice cream for insertion of fruit, nuts, chips, or other flavoring matter, etc., (2) to insert said fruit, nuts and chips, or other flavoring matter and (3) to insert a cup or container for catching the mixed extrudate that will be delivered from the receptacle and to remove the filled cup from the machine.

On all of the above occasions, it is commercially important to protect against accidental engagement with the moving parts, and to make sure that his hands or other body organs or limbs are protected from the moving parts and rotating machinery of the frozen comestible processor. The safety interlock system of this invention is designed to accomplish this objective, and will be explained hereinafter with reference to the figures, wherein like parts have the same designated numerals.

Referring now to FIGS. 1 and 2, a frozen comestible processing apparatus is generally shown by arrow 10. The processing apparatus 10 has a receptacle 11 for insertion of a frozen comestible, such as ice cream. The receptacle 11 is designed to move vertically up or down (arrow 12) into engagement with a rotating auger 13 (FIG. 2). A manually operated handle 14 is moved (arrows 15) by an operator to respectively raise or lower (arrows 12) the receptacle 11, via an appropriate linkage 16 (not shown in detail).

In order to insert the frozen comestible or other materials into the receptacle 11, the operator must initially lift a front slide or access panel 17, that is designed for vertical movement, as shown by arrows 18. This can be manually accomplished by means of knob 19 (FIG. 2). A magnet 20 affixed to a top portion of the apparatus frame 21 will hold the access panel 17 in a fully open position, since the panel has a magnetized or iron flanged abutment 22, that is brought in contact with said magnet 20 when the panel is raised.

The panel has another flanged abutment 23 that is engageable with a lip portion 24 of the receptacle 11, when the receptacle 11 is caused to be vertically raised by handle 14. When the receptacle is raised, it will therefore, caused the panel 17 to be raised as well.

The panel is movable between three separate positions, generally referred to as (1) fully open, (2) partially open and (3) fully closed. For purposes of identification, and to easily relate to the position of other parts that engage with, or become operative with respect to the positions of the panel, we herein denote these three positions by the designations "A", "B" and "C", respectively.

A follower mechanism is actuated by movement of abutment 22 and is comprised of a roller 25 rotatably attached to an arm 26. The roller 25 rests on the flange portion of abutment 22, and is caused to roll and move laterally across (arrow 27) the surface of the flanged abutment as the access panel 17 is caused to move vertically upward. In doing so, the roller 25 will cause the arm 26 to rotate about a wrist pin 28. The arm 26 will rotate to the three separate positions designated "A", "B" and "C" (in FIG. 1 (positions "B" and "C" shown in phantom). A cam 29 affixed to the rotatable arm 26, will likewise assume three separate positions corresponding to the rotatable arm movement. The three separate cam positions are shown in more detail in FIGS. 1a, 1b and 1c, respectively, the cam figures having corresponding letter designated to positions "A", "B", and "C", respectively.

The cam 29 operatively engages a limit switch 30, that is used to actuate a motor (not shown) for rotating the auger 13.

In the "A" and "C" positions, the cam 29 will not be in contact with switch 30. In these positions, the switch 30 which is normally open, will remain open.

In the "B" position, the am 29 contacts switch 30, causing the switch to close, whereby the auger 13 is caused to rotate.

OPERATION OF THE SAFETY INTERLOCK

The safety interlock system of this invention operates as follows:

(1) The panel 17 is first raised to its fully open position "C" by the operator of the frozen comestible apparatus, in order to place a frozen dessert, such as ice cream, into the receptacle 11. With the panel being fully open, switch 30 is open (position "C"), so that the auger 13 will not be rotatively actuated.

(2) After the receptacle 11 is filled with a frozen dessert, the panel 17 is closed (position "A"). The switch 30 is open in this position so that the auger 13 will not be actuated.

(3) Now the operator will pull upon handle 14, causing the receptacle 11 to engage with the auger 13 (position "B"). In this position the panel 17 will be in its partially open position, due to engagement of the receptacle 11 with abutment 23.

The auger 13 will not be easily accessible unless the operator tried to deliberately reach up under the panel 17 to purposely touch the auger, which circumstance is highly unlikely and not part of the operating procedure for the apparatus. In position "B" the switch 30 is closed, causing the auger 13 to rotate, and create a pocket in the comestible disposed in the receptacle.

(4) The operator now pushes handle 14 to disengage the receptacle and auger (position "A"). The access panel 17 is once again raised to its fully open position (position "C") and fruit, nuts, chips, or other flavoring matter, etc., are deposited in the pocket formed in the comestible. The auger 13 is naturally not rotating during this procedural step.

(5) The panel 17 is now closed (position "A") and the operator once more pulls on handle 14 in order to engage the receptacle 11 with the auger 13 (position "B"). The rotating auger 13 will now cause the fruit, nuts, chips or other flavoring matter, etc., and ice cream to be mixed and extruded from the bottom of the receptacle 11, which has an opening for this purpose.

The operator places a container or ice cream cup under the receptacle 11 with the auger 13 (position "B"). The rotating auger 13 will now cause the fruit and ice cream to be mixed and extruded from the bottom of the receptacle 11, which has an opening for this purpose.

The operator places a container or ice cream cup under the receptacle 11, while holding handle 14 in the position of auger and receptacle engagement. The container (not shown) will catch the extrudate. The operator will remove the filled container from under the receptacle 11 and release or push the handle 14 to disengage the auger 13 and receptacle 11.

It will be observed from the above operative description that the auger 13 can never rotate when the access panel 17 is fully open, or when the auger 13 and the receptacle 11 are disengaged.

The terms and expressions which are employed are used as terms of description; it is recognized, though, that various modifications are possible.

It is also understood the following claims are intended to cover all of the generic and specific features of the invention being described, and all statements of the scope of the invention which, as a matter of language, might fall therebetween.

Having described certain forms of the invention in some detail, what is claimed is:

1. A safety apparatus for processing a frozen comestible, including a receptacle for deposit of said frozen comestible therein; a rotatable auger for rotatively contacting and processing said comestible when said auger is in operational engagement with said receptacle;
  means for causing operational engagement between said receptacle and said rotatable auger;
  means for causing rotation of said auger when said auger and said receptacle are in operational engagement and operatively connected to said means for causing auger rotation, and safety interlock means adapted to foil bodily access to said rotating auger;
  said safety interlock means comprising an access panel movable between a fully open, partially open, and a closed position, said safety interlock means preventing actuation of said auger rotation means when said access panel is disposed in said fully open position, or when said receptacle and said auger are disengaged;

an auger rotation limit switch that is normally open when said access panel is in the fully open position, or when said auger and said receptacle are disengaged, said limit switch being operatively connected to said auger rotation means for causing rotation of said auger when said switch is closed, and means operatively connecting said access panel and said operational engagement means to said limit switch;

said means operatively connecting said access panel and said operational engagement means to said limit switch including limiting stop means, a follower and cam linkage disposed between said limit switch and said limiting stop means, said limiting stop means being engagable by either said access panel or said operational engagement means;

said limiting stop means including a first abutment that is affixed to an inside portion of said access panel, said follower resting upon said first abutment and attached to said cam link age, whereby said switch will remain open when said cam over rides said switch as said access panel is moved to said fully open position;

said access panel including a second abutment that is operatively engagable with said receptacle when said receptacle is caused to engage with said auger, whereby said access panel will be automatically raised to a partially open position and said limit switch will be closed by said follower and cam linkage causing said auger to rotate.

2. The invention of claim 1 including magnetic means adapted to engage said first abutment.

3. The invention of claim 2 wherein said access panel is adapted to be retained in fully open position by said magnetic means.

* * * * *